United States Patent
Shin

(10) Patent No.: US 11,954,092 B2
(45) Date of Patent: Apr. 9, 2024

(54) INTERNET OF THINGS (IOT) DEVICE UPDATE VALIDATION

(71) Applicant: T-Mobile USA, Inc., Bellevue, WA (US)

(72) Inventor: Hogan Shin, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 111 days.

(21) Appl. No.: 16/852,250

(22) Filed: Apr. 17, 2020

(65) Prior Publication Data

US 2021/0326331 A1  Oct. 21, 2021

(51) Int. Cl.
| | | |
|---|---|---|
| *G06F 15/173* | (2006.01) | |
| *G06F 8/65* | (2018.01) | |
| *G06F 16/23* | (2019.01) | |
| *H04L 67/00* | (2022.01) | |
| *H04L 67/12* | (2022.01) | |
| *H04L 69/16* | (2022.01) | |
| *H04L 69/329* | (2022.01) | |
| *H04W 4/14* | (2009.01) | |
| *G16Y 30/00* | (2020.01) | |
| *G16Y 40/40* | (2020.01) | |

(52) U.S. Cl.
CPC .......... *G06F 16/2379* (2019.01); *G06F 8/65* (2013.01); *H04L 67/12* (2013.01); *H04L 67/34* (2013.01); *H04L 69/16* (2013.01); *H04L 69/329* (2013.01); *H04W 4/14* (2013.01); *G16Y 30/00* (2020.01); *G16Y 40/40* (2020.01)

(58) Field of Classification Search
CPC ....... G06F 16/2379; G06F 8/65; H04L 67/12; H04L 67/34; H04L 69/16; H04L 69/329; H04W 4/14; G16Y 30/00; G16Y 40/40
See application file for complete search history.

(56) References Cited

U.S. PATENT DOCUMENTS

| | | | | |
|---|---|---|---|---|
| 8,964,543 | B1 * | 2/2015 | Roskind | H04L 47/54 370/231 |
| 9,301,155 | B2 * | 3/2016 | Caldwell | H04L 41/0816 |
| 9,426,148 | B2 * | 8/2016 | Sharma | H04L 63/0428 |
| 9,787,609 | B2 * | 10/2017 | Ranta | H04L 49/552 |
| 10,051,462 | B2 * | 8/2018 | Gupta | H04W 76/40 |
| 10,075,422 | B2 * | 9/2018 | Rawcliffe | H04L 63/08 |
| 10,321,311 | B2 * | 6/2019 | Sasin | H04L 63/0823 |
| 10,382,919 | B2 * | 8/2019 | Karimli | H04W 12/50 |

(Continued)

FOREIGN PATENT DOCUMENTS

WO   WO-2017040940 A1 *  3/2017  ............. H04L 67/12

*Primary Examiner* — Dustin Nguyen
*Assistant Examiner* — Hao H Nguyen
(74) *Attorney, Agent, or Firm* — Lee & Hayes, P.C.

(57) ABSTRACT

An Internet of Things (IoT) server can transmit a series of data blocks of a software update to an IoT device by sending a series of data block messages to the IoT device over a telecommunication network. The IoT device can return data block receipt messages to confirm receipt of the data block messages. The IoT device can also attempt to validate received data block messages, and can return data block validation messages for the data block messages that have been validated. When the IoT server receives data block validation messages for all of the data blocks of the software update, the IoT server can determine that the IoT device has received a usable version of the software update.

20 Claims, 6 Drawing Sheets

(56) References Cited

U.S. PATENT DOCUMENTS

| | | | |
|---|---|---|---|
| 10,602,342 B1* | 3/2020 | Shin | H04B 1/3816 |
| 10,674,357 B2* | 6/2020 | Syed | H04W 8/183 |
| 10,681,621 B2* | 6/2020 | Ahmet | H04W 72/0446 |
| 11,611,872 B2* | 3/2023 | Surles | H04L 41/082 |
| 2003/0033214 A1* | 2/2003 | Mikkelsen | G06Q 30/0601 |
| | | | 705/26.8 |
| 2013/0303206 A1* | 11/2013 | Starsinic | H04W 4/14 |
| | | | 455/466 |
| 2016/0065556 A1* | 3/2016 | Sasin | H04L 63/0823 |
| | | | 726/5 |
| 2016/0308765 A1* | 10/2016 | Le | H04L 45/70 |
| 2017/0113001 A1* | 4/2017 | Trock | G16H 40/40 |
| 2017/0324725 A1* | 11/2017 | Sharma | H04L 51/212 |
| 2018/0332342 A1* | 11/2018 | Wu | H04N 21/6375 |
| 2019/0235092 A1* | 8/2019 | Bastian, II | G01G 19/52 |
| 2020/0267515 A1* | 8/2020 | Stapleford | H04W 4/14 |
| 2020/0272547 A1* | 8/2020 | Ahmet | G06F 11/3664 |
| 2020/0336895 A1* | 10/2020 | Bartlett | H04L 9/3247 |

* cited by examiner

INTERNET OF THINGS (IOT) DEVICE UPDATE VALIDATION

BACKGROUND

Internet of Things (IoT) devices can include sensors and other devices that can send and/or receive data wirelessly. For example, an IoT device can be a temperature sensor that wirelessly transmits temperature measurement data to a network server.

Many IoT devices are designed to be deployed for extended periods of time while operating on battery power. To extend battery life, such IoT devices may have limited computing resources and/or be configured to avoid intensive computing operations. In many cases, IoT devices can be configured to use connectionless data transmission protocols to send and receive relatively small amounts of data, which can assist in extending battery life of the IoT devices.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Introduction

Figure 1:
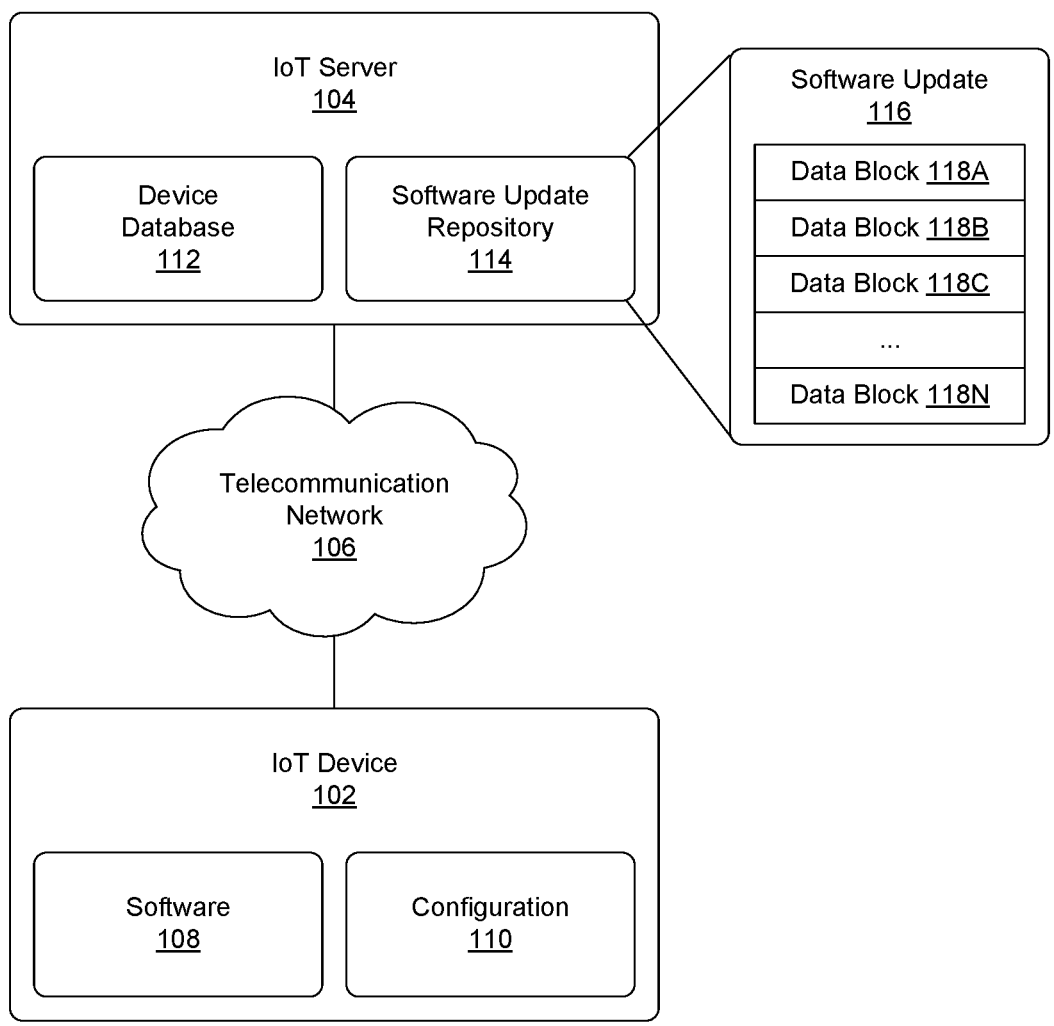
FIG. 1 depicts an example of an IoT device connected to an IoT server via a telecommunication network.

Many IoT devices can wirelessly connect to a telecommunication network to send and/or receive data. IoT devices can include sensors, actuators, meters, appliances, municipal infrastructure equipment, and other types of devices.

IoT devices often run on battery power so that the IoT devices can be deployed in almost any environment without being connected to an external power source. Such IoT devices are often considered "low-power," "constrained," or Lightweight Machine-2-Machine (LwM2M) devices because, to extend battery life, they may have limited computing resources and/or use transmission protocols that can be implemented using less energy than other devices.

As an example, rather than using the Transmission Control Protocol (TCP) or other connection-oriented data transmission protocols that natively provide reliable data transfers, error correction, and other features, many IoT devices use other transmission protocols that offer fewer features but can be less resource-intensive and can therefore help extend the battery life of IoT devices. For example, some IoT devices use asynchronous, connectionless, and/or stateless transport layer protocols, such as the User Datagram Protocol (UDP) or the Short Message Service (SMS) protocol. IoT devices can also use an application layer protocol, such as the Constrained Application Protocol (CoAP) designed for constrained and/or LwM2M devices, to send and receive data. In many situations, such as when an IoT device is sending small amounts of data, such as sensor measurement data, to a network server, these types of asynchronous, connectionless, and/or stateless transport layer protocols can sufficient to transmit the data. However, in other situations in which larger amounts of data are being transferred, the absence of native error detection and/or other features in such protocols may cause issues.

As an example, when an IoT device connects to an IoT server, the IoT server may attempt to send a firmware update to the IoT device. However, if the IoT server sends blocks of the firmware update to the IoT device using a series of CoAP messages according to a connectionless transport layer protocol such as UDP or SMS, the IoT server may not be able to determine if the IoT device received all of the blocks of the firmware update in a useable state. Even if CoAP features cause the IoT device to return acknowledgement messages (ACKs) to the IoT server to confirm that messages containing individual data block have been received by the IoT device, such ACKs may simply indicate that the data block messages have been received at the IoT device, not that the data blocks in those messages are actually usable by the IoT device.

For instance, if transmission errors occur such that an IoT device receives one or more corrupted data blocks of a firmware update from an IoT server, the IoT device may nevertheless respond with ACKs indicating that all of the data blocks have been received. In this situation, the IoT device may become disabled due to the corrupted firmware update, or the IoT device may be unable to install the firmware update. However, based on the ACKs, the IoT server may nevertheless update its records to indicate that the firmware update has been provided to the IoT device.

Described herein are systems and methods by which an IoT device can confirm to an IoT server that individual data blocks of a firmware update or other software update have been both received and validated. Accordingly, when the IoT server receives confirmations that the IoT device has received and validated all of the data blocks of a software update, the IoT server can determine that the IoT device will be able to use the software update and can update records at the IoT server to indicate that the IoT device has been provided with the software update.

Example Environment

FIG. 1 depicts an example of an IoT device 102 connected to an IoT server 104 via a telecommunication network 106. The IoT device 102 can wirelessly connect to the telecommunication network 106 in order to send and/or receive data. For example, an IoT device 102 can send data to the IoT server 104, or another network destination, via a wireless connection with the telecommunication network 106. An example IoT device 102 is illustrated in greater detail in FIG. 3, and is described in detail below with reference to that figure.

The IoT device 102 can be a sensor, actuator, meter, appliance, piece of infrastructure equipment, or any other type of IoT device. As an example, the IoT device 102 can be a temperature sensor that is configured to measure a temperature of the surrounding environment and to transmit temperature measurements to the IoT server 104 or another network destination. As another example, the IoT device 102 can be a "smart" parking meter that can transmit an indication of whether or not a parking space is vacant to the IoT server 104 or another network destination. As yet another example, the IoT device 102 can be an irrigation sensor that is at least partially embedded in soil, and that can transmit reports of measured moisture levels in the soil to the IoT server 104 or another network destination.

An IoT device 102 can be a low-power device that operates on battery power and has computing resources that are configured to prolong battery life. For example, relative to smartphones or other types of mobile computing devices, an IoT device 102 may have a less powerful processor, lower amounts of system memory, and/or other constrained computing resources that are configured to use lower amounts of battery power during operation. Additionally, to extend battery life, an IoT device 102 can be configured use data transmission methods that may be less computationally-intensive than other types of data transmission methods, as will be described below. Accordingly, an IoT device 102 may be considered to be a constrained device and/or a Lightweight Machine-2-Machine (LwM2M) client device.

In some examples, an IoT device 102 can also be a NarrowBand (NB) IoT device. NB-IoT devices can be configured to use a relatively narrow spectrum of frequencies to wirelessly send and/or receive data over long distances using relatively low data transfer rates. NB-IoT devices are often used when data transmissions are expected to be infrequent and/or small. For example, the software 108 and/or configuration 110 for an NB-IoT industrial sensor may configure the sensor to only send a few bytes of data on infrequent occasions when the sensor detects a particular condition in its surrounding environment. NB-IoT devices can accordingly be considered low-power constrained devices and/or LwM2M client devices because they can send and receive infrequent and/or small data transmissions using relatively little amounts of power.

As shown in FIG. 1, the IoT device 102 can store and/or execute software 108. The software 108 can include code or other executable instructions that can control operations of the IoT device 102. For example, the software 108 can be firmware configured to control hardware operations of the IoT device 102, one or more executable applications that can be run by the IoT device 102, an operating system of the IoT device 102, and/or any other computer-readable or machine-executable instructions.

In some examples, the IoT device 102 can also store a configuration 110. The configuration 110 may, for example, be a data file that indicates values of one or more attributes. For example, a configuration 110 include values indicating how often the IoT device 102 should measure data, how often the IoT device 102 should transmit measurement data via the telecommunication network 106, identify a network server or other destination to which the measurement data should be sent, and/or values for any other attributes or variables. Accordingly, in some examples, the IoT device 102 can execute instructions defined in software 108 based on attribute values and/or other data in a configuration 110, such that the operations of the IoT device 102 are defined using a combination of software 108 and a configuration 110. However, in other examples, data in the software 108 may directly indicate attribute values and/or other data that are to be used during execution of the software 108.

An IoT device 102 can register with, and/or attach to, the telecommunication network 106. For example, an IoT device 102 can wirelessly connect to a base station or other access point of an access network, which can in turn connect the IoT device 102 to a core network of the telecommunication network 106. Connections between the IoT device 102 and a base station or other access point, and/or elements of the IoT device 102 and the telecommunication network 106 can be based on one or more radio access technologies, wireless access technologies, protocols, and/or standards. Wireless and radio access technologies, protocols, and standards can include fifth generation (5G) technology, Long Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, Wi-Fi® technology, and/or any other previous or future generation of radio access technology.

In some examples, when the IoT device 102 connects to the telecommunication network 106, the IoT device 102 can connect to a Mobility Management Entity (MME), a gateway, such as a Packet Data Network Gateway (P-GW), and/or other nodes or elements of the telecommunication network 106. The telecommunication network 106 can also connect the IoT device 102 to an element such as a Domain Name System (DNS) server or traffic management server, which can assign an Internet Protocol (IP) address to the IoT device 102.

When the IoT device 102 connects to the telecommunication network 106, the IoT device 102 can also communicate with an IoT server 104 that is positioned within the telecommunication network 106 or is accessible through the telecommunication network 106. The IoT server 104 can be configured to register and/or manage IoT devices 102 that connect to the telecommunication network 106. In some examples, the IoT server 104 can be a LwM2M server. In some examples, there can be multiple instances of the IoT server 104, but a load balancer or other element of the telecommunication network 106 can select a particular instance of the IoT server 104 for a particular IoT device 102.

The IoT device 102 can be configured to communicate with the IoT server 104, via the telecommunication network 106, using data transmission protocols that may be less computationally-intensive and/or are associated with lower power consumption than other types of data transmission protocols. As an example, the IoT device 102 can be configured to send and receive data at an application layer using the Constrained Application Protocol (CoAP) designed for constrained and/or LwM2M devices. The IoT device 102 can also be configured to send and receive application layer messages using an asynchronous, connectionless, and/or stateless transport layer protocol, such as the User Datagram Protocol (UDP) or the Short Message Service (SMS) protocol. Such asynchronous, connectionless, and/or stateless transport layer protocols may be less computationally intensive than the Transmission Control Protocol (TCP) or other connection-oriented transport layer protocols, and may thereby assist in extending battery life of an IoT device 102.

Accordingly, in some examples, the IoT device 102 and the IoT server 104 can be configured to exchange data using CoAP application layer messages that are encapsulated into UDP or SMS transport layer messages. In some examples in which the messages are SMS messages, a Short Message Service Center (SMS-C) in the telecommunication network 106 can store, forward, and/or otherwise process the SMS messages to route the SMS messages between the IoT device 102 and the IoT server 104.

The IoT server 104 can store a device database 112 that contains profile information about IoT devices 102. The device database 112 can, for example, include entries for different IoT devices 102 that are, or have previously, registered with the IoT server 104. An entry in the device database 112 for an IoT device 102 may indicate one or more identifiers associated with the IoT device 102, such as an International Mobile Equipment Identity (IMEI), an International Mobile Subscriber Identity (IMSI), a Mobile Station International Subscriber Directory Number (MSISDN), and/or other identifiers.

In some examples, an IoT device 102 may provide an IMEI and/or IMSI in a registration message sent to the IoT server 104. If the device database 112 does not already contain an entry for the IoT device 102, the IoT server 104 can use the provided IMEI and/or IMSI to look up a corresponding MSISDN in a subscriber database or other data repository on the telecommunication network 106, such that the IoT server 104 can add the corresponding MSISDN to an entry for the IoT device 102 in the device database 112. In examples in which the IoT device 102 and IoT server 104 exchange data using SMS messages, the IoT server 104 may address an SMS message to the IoT device 102 using the MSISDN associated with the IoT device 102. Elements of the telecommunication network 106, such as an SMS-C, may accordingly use the MSISDN to route and deliver the SMS message to the IoT device 102.

An entry for an IoT device 102 in the device database 112 may also indicate a version of software 108 that the IoT server 104 expects to be currently stored on the IoT device 102. In some examples, if the IoT device 102 has not previously registered with the IoT server 104, the IoT server 104 can use an IMEI and/or IMSI associated with the IoT device 102 to look up a device model of the IoT device 102 in another network database and determine a version of software 108 that a vendor, manufacturer, or other entity is expected to have previously loaded on the IoT device 102. The IoT server 104 can accordingly add an identifier of that previously-loaded software version to an entry for the IoT device 102 in the device database 112. In other examples, if the IoT device 102 has previously registered with the IoT server 104, an entry for the IoT device 102 in the device database 112 may already indicate a version of software 108 that is expected to have been previously loaded on the IoT device 102 by a vendor, manufacturer, or other entity, or a version of software 108 that was previously sent to the IoT device 102 by the IoT server 104 itself.

The IoT server 104 can also have a software update repository 114. The software update repository can store one or more software updates 116. The software updates 116 can be full versions of software 108, or patches or other incremental updates to software 108. The software updates 116 can accordingly also be associated with versions of software 108.

When an IoT device 102 connects to the telecommunication network 106 and registers with the IoT server 104, the IoT server 104 may compare a software version indicated by an entry in the device database 112 for the IoT device 102 against a software version of a corresponding software update 116 in the software update repository 114. If the IoT server 104 determines from the device database 112 that the IoT device 102 may have an outdated version of the software 108 relative to a software update 116 available in the software update repository 114, the IoT server 104 can transmit the software update 116 to the IoT device 102.

A software update 116 may be too large to fully fit within a transport layer message, such as a UDP message or an SMS message, that can be sent from the IoT server 104 to the IoT device 102. Accordingly, the IoT server 104 can divide the software update 116 into a set of data blocks 118 and transmit individual data blocks 118 to the IoT device 102 using separate transport layer messages. For example, the IoT server 104 can use CoAP blockwise transfer methods to transmit individual data blocks 118 of a software update 116 in separate UDP messages or SMS messages.

As will be described further below, the IoT device 102 can inform the IoT server 104 when the IoT device 102 has validated messages containing each of the data blocks 118. When the IoT server 104 receives information from the IoT device 102 indicating that the IoT device 102 was able to successfully validate messages containing all of the data blocks 118 of the software update 116, the IoT server 104 can determine that the IoT device 102 successfully received the full software update 116 in an uncorrupted form. The IoT server 104 can accordingly have confidence that the IoT device 102 will be able to successfully install and use the software update 116 due to successful receipt of all of the data blocks 118, and the IoT server 104 can update the device database 112 to indicate that the IoT device 102 has a version of the software 108 corresponding to the software update 116.

Figure 2:
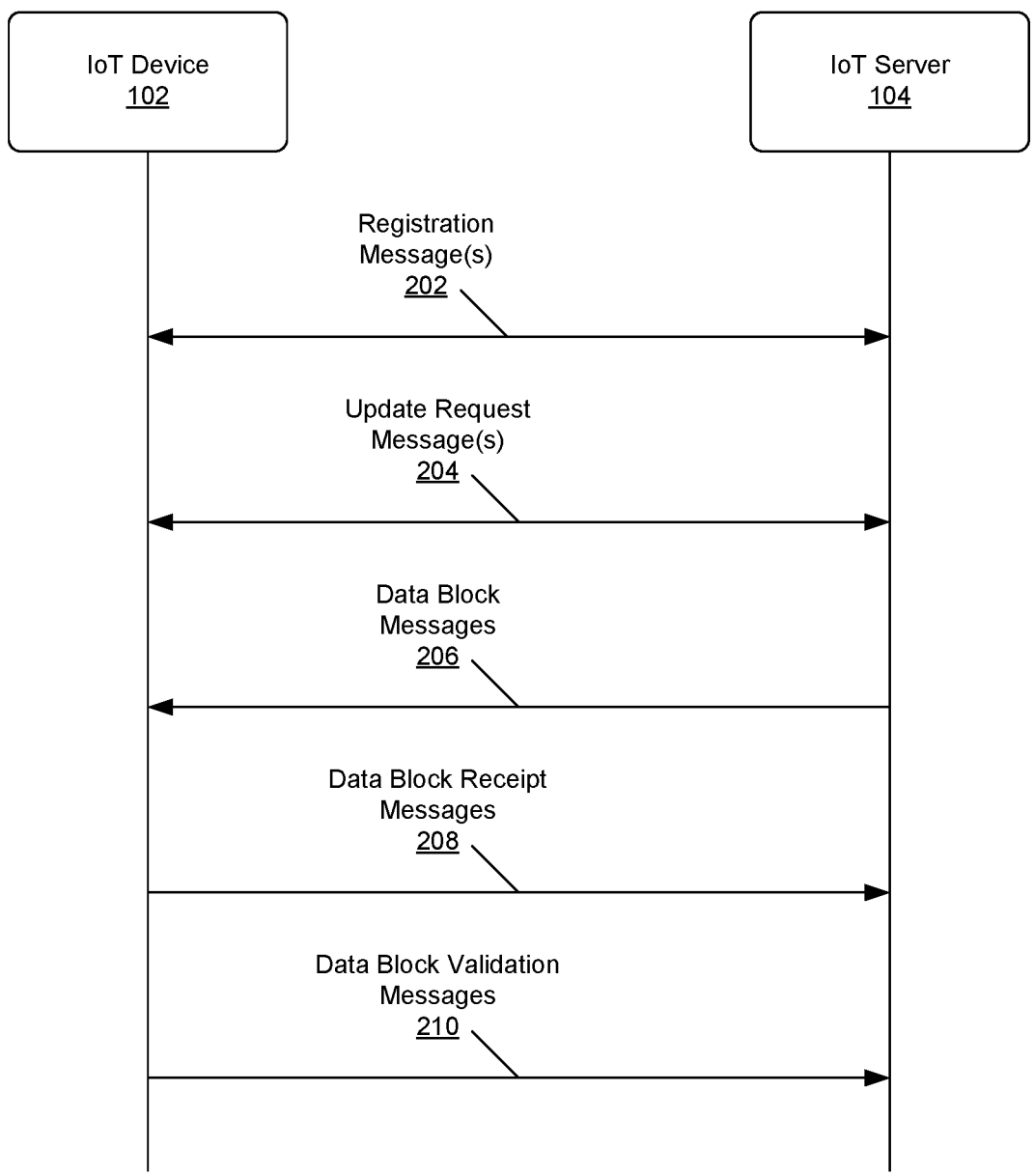
FIG. 2 depicts a sequence of messages that can be exchanged between an IoT device and an IoT server through a telecommunication network.

FIG. 2 depicts a sequence of messages that can be exchanged between an IoT device 102 and an IoT server 104 through a telecommunication network 106. The messages can include one or more registration messages 202, one or more update request messages 204, a series of data block messages 206, a series of data block receipt messages 208, and a series of data block validation messages 210. In some examples, at least some of the messages shown in FIG. 2, such as at the data block messages 206, the data block receipt messages 208, and the data block validation messages 210 can include CoAP application layer messages encapsulated in transport layer messages, such as UDP messages or SMS messages.

When the IoT device 102 connects to the telecommunication network 106, the IoT device 102 can be connected through the telecommunication network 106 to an IoT server 104 as discussed above. The IoT device 102 can transmit a registration message 202 to the IoT server 104 that includes one or more identifiers for the IoT device 102, such as an IMEI and/or IMSI. The IoT server 104 can use the identifiers in the registration message 202 to determine if an entry for the IoT device 102 already exists in the device database 112 of the IoT server 104. If an entry for the IoT device 102 does not exist in the device database 112, the IoT server 104 can add an entry for the IoT device 102 to the device database 112. The IoT server 104 can register the IoT device 102, and in some examples, reply with a registration message 202 confirming that the IoT device 102 has been registered.

As discussed above, the entry for the IoT device 102 in the device database 112 can indicate a version of software 108 that the IoT server 104 expects to be currently stored on the IoT device 102. If the version of the software 108 indicated in the device database 112 is outdated relative to a corresponding software update 116 that is available in the software update repository 114, the IoT server 104 can cause the software update 116 to be provided to the IoT device 102 on a push or a pull basis.

For example, the IoT server 104 can send an update request message 204 to the IoT device 102 that includes a uniform resource identifier (URI) of a location of the software update 116 in the software update repository 114. The IoT device 102 can then send another update request message 204 back to the IoT server 104 to request the software update 116 from the provided URI, such that the IoT device 102 can "pull" the software update 116. In other examples, the IoT server 104 can send an update request message 204 to the IoT device 102 indicating that the IoT server 104 is, or will be, pushing the software update 116 to the IoT device 102. In still other examples, the IoT server 104 can begin sending data block messages 206 to the IoT device 102 without an up-front update request message 204 in order to "push" the software update 116 to the IoT device 102.

To transfer the software update 116 to the IoT device 102 on a push or a pull basis, the IoT server 104 can send a series of data block messages 206 to the IoT device 102. Each data block message 206 can include an individual data block 118 of the larger software update 116. For example, a data block message 206 can include a CoAP message with header containing a unique message identifier and a body containing one of the data blocks 118 of the software update 116, and may be encapsulated into a transport layer message, such as a UDP message or SMS message.

In some examples, the IoT device 102 can be configured to respond to the receipt of each data block message 206 by sending a corresponding data block receipt message 208 back to the IoT server 104. A data block receipt message 208 can be an acknowledgement ("ACK") message or Proof of Receipt ("POR") message indicating that the IoT device 102 has received a particular data block message 206. In some examples, a data block receipt message 208 can reference a message identifier of a corresponding data block message 206 to confirm that the IoT device 102 received the corresponding data block message 206.

The IoT server 104 can track when and if data block receipt messages 208 are received from the IoT device 102 in reply to individual data block messages 206. In some examples, if the IoT server 104 does not receive a data block receipt message 208 in response to a data block message 206 within a reception time threshold following transmission of the data block message 206, the IoT server 104 can resend a corresponding data block 118 to the IoT device 102 in a new or repeated data block message 206.

In some examples, the IoT server 104 can send a first data block message 206 containing a first data block 118 of a software update 116, and wait to send a next data block message 206 containing a second data block 118 of the software update 116 until the IoT server 104 receives a data block receipt message 208 in response to the first data block message 206. In other examples, the IoT server 104 can send a set of data block messages 206 containing different data blocks 118 of the software update 116 without waiting for data block receipt messages 208, and then resend any data blocks 118 for which data block receipt messages 208 are not received within the reception time threshold.

Although data block receipt messages 208 can indicate to the IoT server 104 that the IoT device 102 received corresponding data block messages 206, the data block receipt messages 208 may not directly indicate whether the IoT device 102 was able to validate those data block messages 206. For example, the IoT device 102 may send a data block receipt message 208 upon receiving a data block message 206, even if transmission errors occurred and the data block 118 carried by the data block message 206 is corrupted or unusable when it arrives at the IoT device 102.

The IoT device 102 can accordingly perform a validation process to attempt to validate received data block messages 206 and verify that data blocks 118 carried by the received data block messages 206 are uncorrupted and usable by the IoT device 102. For example, the IoT device 102 can use a message authentication code (MAC), checksum, hash value, digital signature, or other authenticator data associated with a data block message 206 to attempt to confirm data integrity of a received data block message 206. In some examples, the IoT device 102 may receive MACs or other authenticators for data block messages 206 from the IoT server 104 before the IoT server 104 sends the data block messages 206, for example within an update request message 204 or other message.

If the IoT device 102 determines based on a MAC or other authenticator that a received data block message 206 has not been altered, the IoT device 102 can determine that a data block 118 in the received data block message 206 will be valid and usable by the IoT device 102 when the data block 118 is combined with other data blocks 118 of the software update 116. The IoT device 102 can accordingly send a data block validation message 210 to the IoT server 104 that confirms that the IoT device 102 has validated a received data block message 206. A data block validation message 210 associated with a data block message 206 can be sent by the IoT server 104 separately than a data block receipt message 208 that is also associated with the data block message 206. In some examples, a data block validation message 210 can reference a message identifier of a corresponding data block message 206 to confirm that the IoT device 102 has validated the corresponding data block message 206.

The IoT server 104 can track when and if data block validation messages 210 are received from the IoT device 102 in reply to individual data block messages 206. If the IoT server 104 sends a data block message 206 to the IoT device 102, but does not receive a data block validation message 210 within a validation time threshold confirming that the IoT device 102 has validated the data block message 206, the IoT server 104 can resend a corresponding data block 118 to the IoT device 102 in a new or repeated data block message 206. Accordingly, even if the IoT server 104 receives a data block receipt message 208 indicating that the IoT device 102 successfully received a data block message 206, the IoT server 104 may not also receive a data block validation message 210 within the validation time threshold indicating that the IoT device 102 was able to successfully validate that data block message 206. Accordingly, in this situation, the IoT server 104 can resend the corresponding data block 118 to the IoT device 102 in a new or repeated data block message 206.

In some examples, the validation time threshold associated with data block validation messages 210 can be longer than the reception time threshold associated with data block receipt messages 208. For instance, although the IoT device 102 may be able to return a data block receipt message 208 relatively quickly after the IoT device 102 receives a data block message 206, it may take longer for the IoT device 102 to perform a validation process to attempt to validate a received data block message 206. Accordingly, the validation time threshold can be higher than the reception time threshold to permit the IoT device 102 time to perform the validation process. As a non-limiting example, the reception time threshold may be thirty seconds and the validation time threshold may be five minutes. In this example, an IoT server 104 can be configured to resend a data block 118 if the IoT server 104 does not receive a data block receipt message 208 within a thirty-second reception time threshold period after sending the data block 118 in a data block message 206. If the IoT server 104 does receive a data block receipt message 208 within the thirty-second reception time threshold, the IoT server 104 may still ultimately resend the data block 118 if the IoT server 104 does not also receive a data block validation message 210 within a five-minute validation time threshold period, because the expiration of the five-minute validation time threshold period may indicate that the IoT device 102 received the data block message 206 but could not validate the data block message 206. In other examples, the reception time threshold may set higher or lower than thirty seconds, and/or the validation time threshold may be set higher or lower than five minutes.

Once the IoT server 104 receives a set of data block validation messages 210 indicating that the IoT device 102 has successfully validated a series of data block messages 206 that collectively contain all of the data blocks 118 of the software update 116, the IoT server 104 can determine that the IoT device 102 has successfully received the set of data blocks 118 that make up the full software update 116 in an uncorrupted and usable form. The IoT server 104 can therefore update the device database 112 to indicate that the IoT device 102 now has a version of the software 108 corresponding to the software update 116.

In some examples, the IoT server 104 can include flags, header values, or other information in a data block message 206 that indicates to the IoT device 102 that the IoT device 102 should respond with one or both of a data block receipt message 208 and a data block validation message 210. For example, when a data block message 206 includes a flag or header value indicating that the IoT device 102 should return a data block validation message 210 when the IoT device 102 validates the data block message 206, that flag can indicate to the IoT device 102 that the data block message 206 contains more important data than other types of server messages for which validation messages are not expected.

Example Architecture

Figure 3:
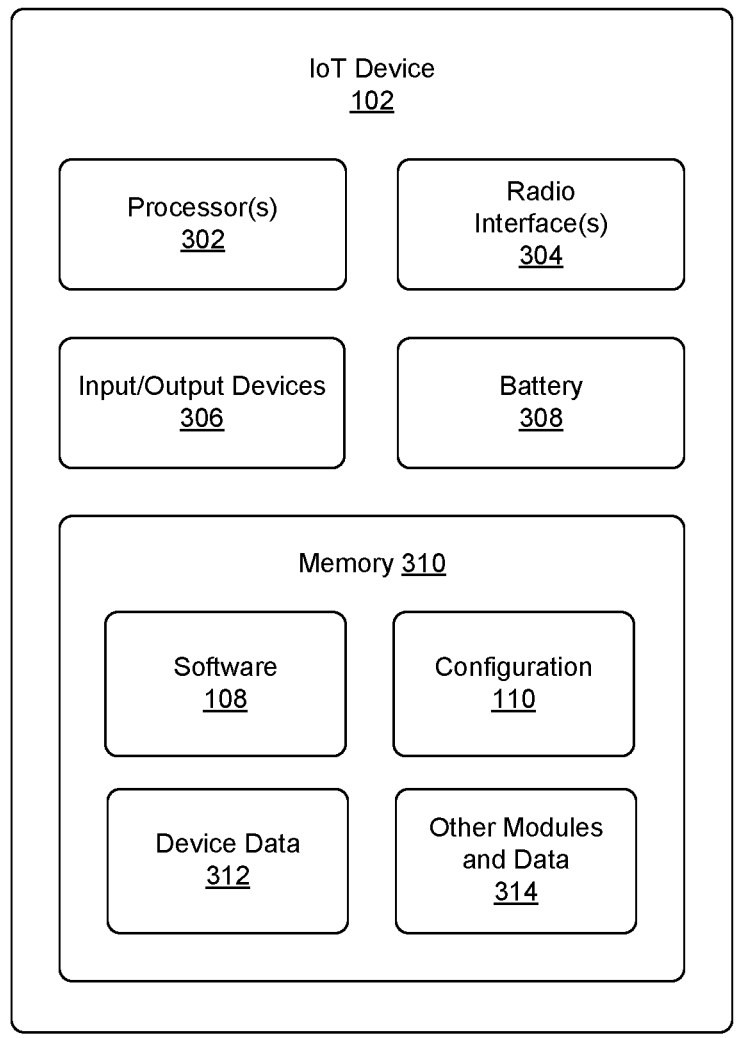
FIG. 3 depicts an example system architecture for an IoT device.

FIG. 3 depicts an example system architecture for an IoT device 102. As shown, an IoT device 102 can include processor(s) 302, radio interfaces 304, input and/or output devices 306, a battery 308, and/or memory 310. The memory 310 can store software 108, a configuration 110, device data 312, and/or other modules and data 314.

In various examples, the processor(s) 302 can be a central processing unit (CPU), a graphics processing unit (GPU), both CPU and GPU, or any other type of processing unit. Each of the one or more processor(s) 302 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 302 may also be responsible for executing computer applications and/or instructions stored in the memory 310, which can be associated with common types of volatile (RAM) and/or nonvolatile (ROM) memory.

The radio interfaces 304 can include transceivers, modems, interfaces, antennas, and/or other components that perform or assist in exchanging radio frequency (RF) communications with an access point through which the IoT device 102 can connect to the telecommunication network. In some examples, the radio interfaces 304 can be configured to use a relatively narrow spectrum of frequencies to wirelessly send and/or receive data over long distances using relatively low data transfer rates, such that the IoT device 102 is considered an NB-IoT device. The radio interfaces 304 can also be configured to perform LwM2M communications, for example by sending and receiving CoAP messages via an asynchronous, connectionless, and/or stateless transport layer protocol such as UDP or SMS.

Depending on the nature of the IoT device 102, the IoT device 102 can have one or more input devices 306 and/or output devices 306. Input devices 306 can be sensors, cameras, microphones, user input devices, and/or any other input device through which an IoT device 102 can obtain data about its environment and/or receive data from users or other devices. For example, when the IoT device 102 is a "smart" parking meter, it can include one or more sensors that can detect whether a parking space is vacant. Measurements, sensor reading, captured audio, images, or video, or any other data obtained by the input devices 306 can be stored in memory 310 as device data 312. The device data 312 can be transmitted by the radio interfaces 304 to an IoT server 104 or other network destination. Some IoT devices 102 can have output devices 306, such as screens or speakers, through which it can display or otherwise output device data 312 and/or other data.

The battery 308 can provide power to the processor(s) 302, radio interfaces 304, input and output devices 306, and/or any other components of the IoT device 102. In some examples, the battery 308 can store enough energy to power the IoT device 102 for an extended period of time without recharging or replacement.

Memory 310 can include system memory, which may be volatile (such as RAM), non-volatile (such as ROM, flash memory, etc.) or some combination of the two. The memory 310 can further include machine readable media and/or non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the IoT device 102. Any such non-transitory computer-readable media may be part of the IoT device 102.

Other modules and data 314 stored in memory 310 can be utilized by the IoT device 102 to perform or enable performing any action taken by the IoT device 102. The other modules and data 314 can include a IoT device platform, operating system, and applications in addition to the software 108 and the configuration 110, and/or data utilized by the platform, operating system, applications, or other elements of the IoT device 102.

The IoT device 102 can have one or more sets of instructions, such as software or firmware, that embodies any one or more of the methodologies or functions described herein. The instructions can reside, completely or at least partially, within the memory 310, processor(s) 302, and/or radio interface(s) 304 during execution thereof by the IoT device 102. The memory 310 and the processor(s) 302 also can constitute machine readable media.

Figure 4:
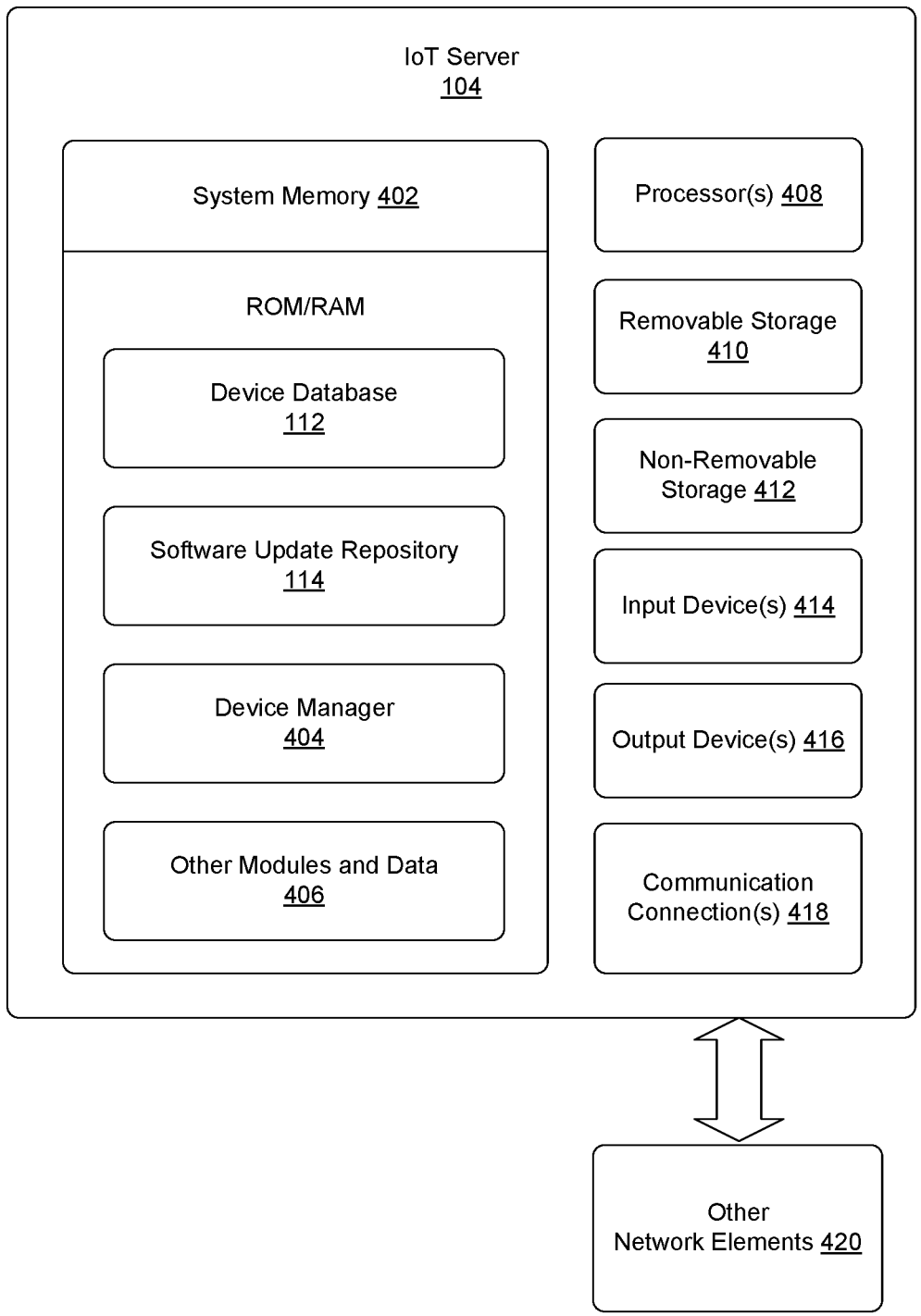
FIG. 4 depicts an example system architecture for an IoT server.

FIG. 4 depicts an example system architecture for an IoT server 104. An IoT server 104 can have a system memory 402 that stores data for the IoT server 104, including the device database 112, the software update repository 114, a device manager 404, and/or other modules and data 406.

In various examples, system memory 402 can be volatile (such as RAM), non-volatile (such as ROM, flash memory, etc.), or some combination of the two. Example system memory 402 can include one or more of RAM, ROM, EEPROM, a Flash Memory, a hard drive, a memory card, an optical storage, a magnetic cassette, a magnetic tape, a magnetic disk storage or another magnetic storage devices, or any other medium.

The device manager 404 can be configured to perform actions associated with registration and/or management of IoT devices 102 that connect to the IoT server 104. For example, the device manager 404 can receive registration messages 202 from IoT devices 102, access and/or edit entries in the device database 112 about IoT devices 102, determine if the device database 112 indicates that IoT devices 102 have outdated software 108 relative to software updates 116 that are available in the software update repository 114, cause data block messages 206 to be sent to IoT devices 102, track the receipt of data block receipt messages 208 and/or data block validation messages, and/or perform others actions associated with registration or management of IoT devices 102.

The other modules and data 406 can be utilized by the IoT server 104 to perform or enable performing any action taken by the IoT server 104. The other modules and data 406 can include a platform and applications, and data utilized by the platform and applications.

The IoT server 104 can also include processor(s) 408, removable storage 410, non-removable storage 412, input device(s) 414, output device(s) 416, and/or communication connections 418 for communicating with other network elements 420.

In some embodiments, the processor(s) 408 can be a central processing unit (CPU), a graphics processing unit (GPU), both CPU and GPU, or other processing unit or component known in the art.

The IoT server 104 can also include additional data storage devices (removable and/or non-removable) such as, for example, magnetic disks, optical disks, or tape. Such additional storage is illustrated in FIG. 4 by removable storage 410 and non-removable storage 412. Computer storage media may include volatile and nonvolatile, removable and non-removable media implemented in any method or technology for storage of information, such as computer readable instructions, data structures, program modules, or other data. System memory 402, removable storage 410 and non-removable storage 412 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by the IoT server 104. Any such computer-readable storage media can be part of the IoT server 104. In various examples, any or all of system memory 402, removable storage 410, and non-removable storage 412, store programming instructions which, when executed, implement some or all of the herein-described operations of the IoT server 104.

In some examples, the IoT server 104 can also have input device(s) 414, such as a keyboard, a mouse, a touch-sensitive display, voice input device, etc., and/or output device(s) 416 such as a display, speakers, a printer, etc. These devices are well known in the art and need not be discussed at length here.

The IoT server 104 can also contain communication connections 418 that allow the IoT server 104 to communicate with other network elements 420, such as elements of the telecommunication network 106. For example, the IoT server 104 can use the communication connections 418 to communicate with an MME, network gateway, load balancer, SMS-C, and/or other network elements, as well as to communicate with the IoT device 102 via such network elements.

Example Operations

Figure 5:
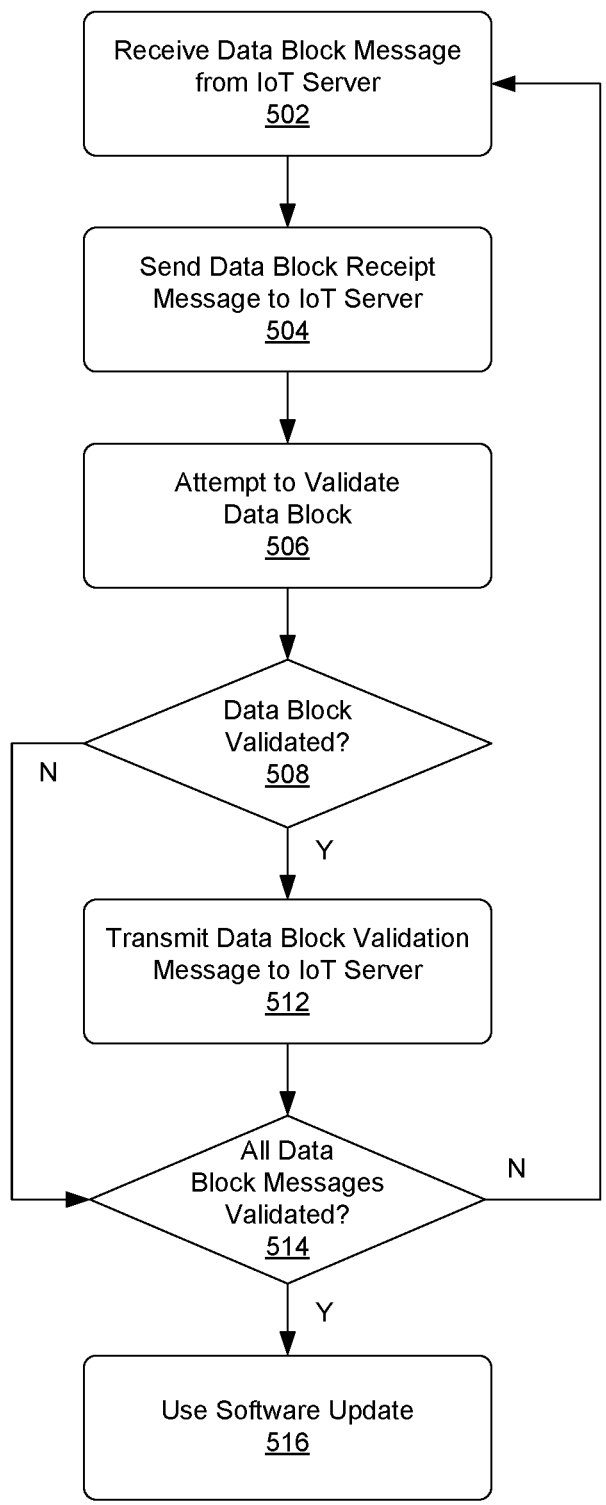
FIG. 5 depicts a flowchart of a method by which an IoT device can validate a software update provided by an IoT server through a telecommunication network.

FIG. 5 depicts a flowchart of a method by which an IoT device 102 can validate a software update 116 provided by an IoT server 104 through a telecommunication network 106. In some examples, the method of FIG. 5 can be initiated when the IoT device 102 registers with the IoT server 104, and the IoT server 104 begins to push data blocks 118 of a software update 116 to the IoT device 102. In other examples, the method of FIG. 5 can be initiated when the IoT server 104 provides a URI of the software update 116 to the IoT device 102, and the IoT device 102 pulls the software update 116 by sending an update request message 204 to the IoT server 104 to request the software update 116 from the provided URI.

At operation 502, the IoT device 102 can receive a data block message 206 from the IoT server 104. The data block message 206 can contain a data block 118 of the software update 116. For example, the data block message 206 can be, at an application layer level, a CoAP message that includes the data block 118. In some examples, the data block message 206 can be, at a transport layer level, an SMS message transmitted through the telecommunication network 106. The IoT server 104 can use a MSISDN associated with the IoT device 102 to transmit such an SMS data block message 206 via an SMS-C of the telecommunication network 106. In other examples, the data block message 206 can be a UDP message at the transport layer level.

At operation 504, the IoT device 102 can send a data block receipt message 208 to the IoT server 104 to confirm that the IoT device 102 has received the data block message 206. In some examples, the data block receipt message 208 can be a CoAP message at the application layer, and an SMS or UDP message at the transport layer. The data block receipt message 208 can reference a unique identifier of the data block message 206 to inform the IoT server 104 that the IoT device 102 received the corresponding data block message 206.

At operation 506, the IoT device 102 can attempt to validate the data block message 206. In various examples, the IoT device can use a MAC, checksum, hash value, digital signature, or other authenticator data to attempt to confirm data integrity of the received data block message 206.

At operation 508, the IoT device 102 can determine whether the validation process performed at operation 506 was successful. If the data block message 206 was validated at operation 506, the IoT device 102 can move to operation 512 and send a data block validation message 210 to the IoT server 104. In some examples, the data block validation message 210 can be a CoAP message at the application layer, and an SMS or UDP message at the transport layer. The data block validation message 210 can reference a unique identifier of the data block message 206 to inform the IoT server 104 that the IoT device 102 was able to validate the corresponding data block message 206.

However, if the data block message 206 was not validated at operation 506, the IoT device 102 may skip operation 512 and not send a data block validation message 210 corresponding to the data block message 206. The IoT server 104 may be configured with a validation time threshold, such that when the IoT device 102 does not send a data block validation message 210 for a particular data block message 206 within the validation time threshold period, the IoT server 104 can resend the data block 118 in a new or repeated data block message 206 that the IoT device 102 can receive at operation 502. In alternate examples, the IoT device 102 may send an error message to the IoT server 104 indicating that the IoT device 102 could not validate a received data block message 206.

At operation 514, the IoT device 102 can determine if data block messages 206 containing all of the data blocks 118 of the software update 116 have been received and validated. In some examples, the data blocks 118 may be numbered sequentially by the IoT server 104, and the IoT device can verify whether data blocks 118 with all of the numbers of the sequence have been received and validated to determine if all of the data blocks 118 of the software update 116 have been received and validated, or if any data blocks 118 of the software update 116 are still to be received and validated. In other examples, the IoT device 102 may compare an aggregate size of the received and validated data blocks 118 against information about the size of the software update 116 provided by the IoT server 104 to determine whether or not data block messages 206 for additional data blocks 118 are still to be received and validated. In still other examples, the IoT device 102 can use any other process to determine if data block messages 206 containing all of the data blocks 118 have been received and validated.

If data block messages 206 containing all of the data blocks 118 have not yet been received and validated, the IoT device 102 can return to operation 502 and wait to receive the next data block message 206 from the IoT server 104. For example, if the IoT device 102 could not validate a data block message 206 associated with a particular data block 118, the IoT device can wait for the IoT server 104 to resend the data block 118 in a new or repeated data block message 206 after a validation time threshold period expires. The IoT device 102 can then move through the operations shown in FIG. 5 to attempt to validate the new or repeated data block message 206.

If the IoT device 102 determines at operation 514 that data block messages 206 containing all of the data blocks 118 have been received and validated, the IoT device 102 can assemble or otherwise combine the data blocks 118 into the full software update 116. The IoT device 102 can then use the software update 116, for example to install, upgrade, and/or use corresponding software 108.

In some examples, the IoT device 102 may perform operations shown in FIG. 5 in parallel or out of sequence in association with different messages for different data blocks 118 of a software update 116. For example, the IoT device 102 may receive a series of data block messages 206 at operation 502 and quickly return a corresponding series of data block receipt messages 208 at operation 504, before attempting to validate one or more of the received data block messages 206 at operation 506. As another example, the IoT device 102 may be attempting to validate a received data block message 206 at operation 506 when the IoT device 102 receives a subsequent data block message 206 at operation 502.

Figure 6:
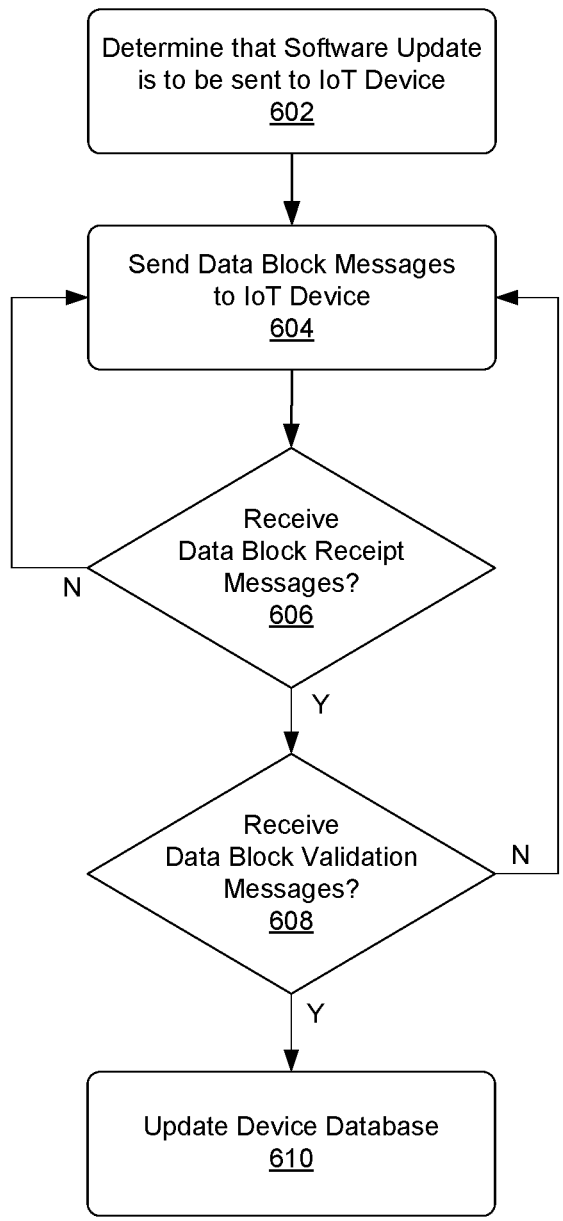
FIG. 6 depicts a flowchart of a method by which an IoT server can provide a series of data blocks of a software update to an IoT device.

FIG. 6 depicts a flowchart of a method by which an IoT server 104 can provide a series of data blocks 118 of a software update 116 to an IoT device 102. In some examples, the method of FIG. 6 can be initiated after the IoT device 102 registers with the IoT server 104.

At operation 602, the IoT server 104 can determine that a software update 116 is to be provided to the IoT device 102. For example, the IoT server 104 can use an IMEI, IMSI, and/or other identifier provided by the IoT device 102 to find a corresponding entry for the IoT device 102 in the device database 112. If the entry in the device database 112 lists an older version of software 108 than is available in the software update repository 114, the IoT server 104 can determine that a corresponding software update 116 should be sent to the IoT device 102. In some examples, the IoT server 104 can send the IoT device 102 an update request message 204 that includes a URI of the software update 116, and wait for the IoT device 102 request the software update 116. In other examples, the IoT server 104 can begin pushing the software update 116 to the IoT device 102.

At operation 604, the IoT server 104 can transmit individual data block messages 206 that each contain a data block 118 of the software update 116. For example, a data block message 206 can be, at an application layer level, a CoAP message that includes a data block 118. In some examples, a data block message 206 can be, at a transport layer level, an SMS message transmitted through the telecommunication network 106. The IoT server 104 can use a MSISDN associated with the IoT device 102 to transmit such an SMS data block message 206 via an SMS-C of the telecommunication network 106. In other examples, the data block message 206 can be a UDP message at the transport layer level.

At operation 606, the IoT server 104 can determine if data block receipt messages 208 have been received from the IoT device 102 for data block messages 206 sent at operation 604. In some examples, a data block receipt message 208 can be a CoAP message at the application layer, and an SMS or UDP message at the transport layer. A data block receipt message 208 can reference a unique identifier of a data block message 206 to inform the IoT server 104 that the IoT device 102 received the corresponding data block message 206.

The IoT server 104 can resend any data block messages 206 at operation 604 if corresponding data block receipt messages 208 have not been received within a reception time threshold period after transmitting the data block messages 206. In some examples, the IoT server 104 can send an individual data block message 206, wait for a corresponding data block receipt message 208, and then resend the data block message if the data block receipt message 208 does not arrive or move to sending the next individual data block message 206 if the data block receipt message 208 does arrive. In other examples, the IoT server 104 can transmit a larger set of data block messages 206, and then resend any data block messages 206 for which corresponding data block receipt messages 208 are not received.

At operation 608, the IoT server 104 can determine if data block validation messages 210 have been received from the IoT device 102 for data block messages 206 sent at operation 604.

In some examples, the data block validation message 210 can be a CoAP message at the application layer, and an SMS or UDP message at the transport layer. The data block validation message 210 can reference a unique identifier of the data block message 206 to inform the IoT server 104 that the IoT device 102 was able to validate the corresponding data block message 206. In some examples, a data block validation message 210 can be a CoAP message at the application layer, and an SMS or UDP message at the transport layer. A data block validation message 210 can reference a unique identifier of a data block message 206 to inform the IoT server 104 that the IoT device 102 was able to validate the corresponding data block message 206.

The IoT server 104 can resend any data block messages 206 at operation 604 if corresponding data block validation messages 210 have not been received within a validation time threshold period after transmitting the data block messages 206. In some examples, the IoT server 104 may receive a data block receipt message 208 at operation 604 that corresponds to a particular data block message 206 sent at operation 606. However, although the data block receipt message 208 confirms that the IoT device 102 received the data block message 206, the IoT server 104 may not receive a data block validation message 210 that corresponds to a particular data block message 206 sent at operation 606. This can indicate that the IoT device 102 could not validate the received data block message 206. Accordingly, the IoT server 104 can return to operation 604 and resend the data block message 206 or send a new data block message 206 containing the same data block 118. The IoT server 104 can use operation 604 and operation 606 to track whether the resent data block message 206 is received and validated by the IoT device 102.

After the IoT server 104 determines using operations 604-608 that the IoT device has both received and validated data block messages 206 containing all of the data blocks 118 of the software update, the IoT server 104 can update the device database 112 at operation 610 to indicate that the IoT device 102 has been provided with the software update 116. For example, the IoT server 104 can edit an entry for the IoT device 102 in the device database 112 to reflect a version of software 108 corresponding to the software update 116 provided using the process of FIG. 6.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method, comprising:
identifying, by an Internet of Things (IoT) server, a software update for an IoT device, wherein the software update is divided into a plurality of data blocks;
associating, by the IoT server, the plurality of data blocks to a plurality of data block messages;
adding, by the IoT server, an indicator to one or more of the plurality of data block messages, the indicator:
indicating the one or more of the plurality of data block messages being different from other data block messages without indicators, and
requiring the IoT device to:
return one or more data block validation messages corresponding to the one or more of the plurality of data block messages upon validation, and
refrain from sending block validation messages corresponding to the other data block messages without the indicators;
sending, by the IoT server, the plurality of data blocks to the IoT device in the plurality of data block messages;
receiving, by the IoT server, a plurality of data block receipt messages from the IoT device that correspond to the plurality of data block messages;
receiving, by the IoT server, the one or more data block validation messages from the IoT device, the one or more data block validation messages corresponding to, and confirming that the IoT device has successfully validated, the one or more of the plurality of data block messages with the indicator; and
updating, by the IoT server, a device database to indicate that the IoT device has been provided with the software update.

2. The method of claim 1, further comprising:
resending, by the IoT server, the one or more of the plurality of data block messages to the IoT device when the IoT server does not receive corresponding data block receipt messages from the IoT device within a reception time threshold.

3. The method of claim 1, further comprising:
resending, by the IoT server, the one or more of the plurality of data block messages to the IoT device when the IoT server does not receive the one or more data block validation messages from the IoT device within a validation time threshold.

4. The method of claim 1, wherein the software update is at least one of: a firmware update, an application update, or an operating system update.

5. The method of claim 1, wherein the plurality of data block messages, the plurality of data block validation messages, and the plurality of data block receipt messages are Constrained Application Protocol (CoAP) messages at an application layer.

6. The method of claim 1, wherein the one or more of the plurality of data block messages, the plurality of data block validation messages, and the plurality of data block receipt messages are User Datagram Protocol (UDP) messages at a transport layer.

7. The method of claim 1, wherein the plurality of data block messages, the plurality of data block validation messages, and the plurality of data block receipt messages are Short Message Service (SMS) messages at an application layer.

8. The method of claim 1, wherein the IoT server identifies the software update by determining that an entry for the IoT device in the device database has an older software version number than corresponds to the software update.

9. An Internet of Things (IoT) server, comprising:
one or more processors;
memory storing computer-executable instructions that, when executed by the one or more processors, cause the IoT server to perform operations comprising:
identifying a software update for an IoT device, wherein the software update is divided into a plurality of data blocks;
associating the plurality of data blocks to a plurality of data block messages;
adding an indicator to one or more of the plurality of data block messages, the indicator:
indicating the one or more of the plurality of data block messages being different from other data block messages without indicators, and
requiring the IoT device to:
return one or more data block validation messages corresponding to the one or more of the plurality of data block messages upon validation, and
refrain from sending block validation messages corresponding to the other data block messages without the indicators;
sending the plurality of data blocks to the IoT device in the plurality of data block messages;
receiving a plurality of data block receipt messages from the IoT device that correspond to the plurality of data block messages;
receiving the one or more data block validation messages from the IoT device, the one or more data block validation messages corresponding to, and confirming that the IoT device has successfully validated, the one or more of plurality of data block messages with the indicator; and updating a device database to indicate that the IoT device has been provided with the software update.

10. The IoT server of claim 9, wherein the plurality of data block receipt messages confirm that the IoT device has received the plurality of data block messages.

11. The IoT server of claim 9, wherein the operations further comprise resending the one or more of the plurality of data block messages to the IoT device when the IoT server does not receive the one or more data block validation messages from the IoT device within a validation time threshold.

12. The IoT server of claim 9, wherein the plurality of data block messages, the plurality of data block validation messages, and the plurality of data block receipt messages are Constrained Application Protocol (CoAP) messages at an application layer.

13. The IoT server of claim 9, wherein the plurality of data block messages, the plurality of data block validation messages, and the plurality of data block receipt messages are User Datagram Protocol (UDP) messages.

14. The IoT server of claim 9, wherein the plurality of data block messages, the plurality of data block validation messages, and the plurality of data block receipt messages are Short Message Service (SMS) messages at an application layer.

15. The IoT server of claim 9, wherein the IoT server identifies the software update by determining that an entry for the IoT device in the device database has an older software version number than corresponds to the software update.

16. A method comprising:
   receiving, by an Internet of Things (IoT) device, a plurality of data block messages from an IoT server, individual ones of the plurality of data block messages containing individual ones of a plurality of data blocks of a software update, one or more of the plurality of data block messages having an indicator, the indicator:
      indicating the one or more of the plurality of data block messages being different from other data block messages without indicators, and
      requiring the IoT device to:
         return one or more data block validation messages corresponding to the one or more of the plurality of data block messages upon validation, and
         refrain from sending block validation messages corresponding to the other data block messages without the indicators;
   sending, by the IoT device, data block receipt messages to the IoT server in response to receiving the plurality of data block messages;
   attempting, by the IoT device to validate individual ones of the plurality of data block messages;
   sending, by the IoT device, the one or more data block validation messages to the IoT server in response to, and confirming that the IoT device has successfully validated, the one or more of the plurality of data block messages with the indicator;
   determining, by the IoT device, that the plurality of data blocks of the software update have been received in validated ones of the plurality of data block messages; and
   using, by the IoT device, the software update by combining the plurality of data blocks.

17. The method of claim 16, wherein the software update is at least one of: a firmware update, an application update, or an operating system update.

18. The method of claim 16, wherein the plurality of data block messages, the data block receipt messages, and the data block validation messages are Constrained Application Protocol (CoAP) messages at an application layer.

19. The method of claim 16, wherein the plurality of data block messages, the data block receipt messages, and the data block validation messages are User Datagram Protocol (UDP) messages at a transport layer.

20. The method of claim 16, wherein the plurality of data block messages, the data block receipt messages, and the data block validation messages are Short Message Service (SMS) messages at an application layer.

* * * * *